United States Patent [19]

Jörgensen et al.

[11] 4,399,745

[45] Aug. 23, 1983

[54] METHOD OF BUNDLING BRUSHWOOD

[75] Inventors: Karl G. Jörgensen, Sollentuna; Leif L. Magnusson, Järfälla; Curt S. Olsson, Vallentuna, all of Sweden

[73] Assignee: Sikob Svensk Industris Konstruktions-Och Beräkningskontor AB, Sollentuna, Sweden

[21] Appl. No.: 229,768

[22] Filed: Jan. 28, 1981

[30] Foreign Application Priority Data

Feb. 6, 1980 [SE] Sweden ............................... 8000961

[51] Int. Cl.³ ............................................ B65B 13/18
[52] U.S. Cl. ............................................ 100/2; 100/6; 56/14.3
[58] Field of Search ................... 100/2, 6, 13; 56/14.3, 56/94

[56] References Cited

U.S. PATENT DOCUMENTS

| | | | |
|---|---|---|---|
| 988,347 | 4/1911 | Johnson | 100/13 |
| 2,856,845 | 10/1958 | Beyette | 100/13 |
| 2,974,457 | 3/1961 | Saxton | 100/13 |
| 3,320,989 | 5/1967 | Verardo | 100/6 |

*Primary Examiner*—Billy J. Wilhite
*Attorney, Agent, or Firm*—Browdy & Neimark

[57] ABSTRACT

In a method of forming bundles of brushwood, brushwood is fed to a bundle former of a bundling machine. The various items are oriented by the machine in a manner such that the thick ends of the items lie on the outside of a finished bundle while the thin ends extend in towards the center of the bundle, and such that the thick ends of the various items of brushwood are displaced relative to one another in the longitudinal direction of the bundle. The method is continuous, and hence a bundle is constantly formed in the bundle former. As the bundle leaves the bundle former, the bundle is bound with straps or like securing elements, and cut into lengths of the desired size.

4 Claims, 4 Drawing Figures

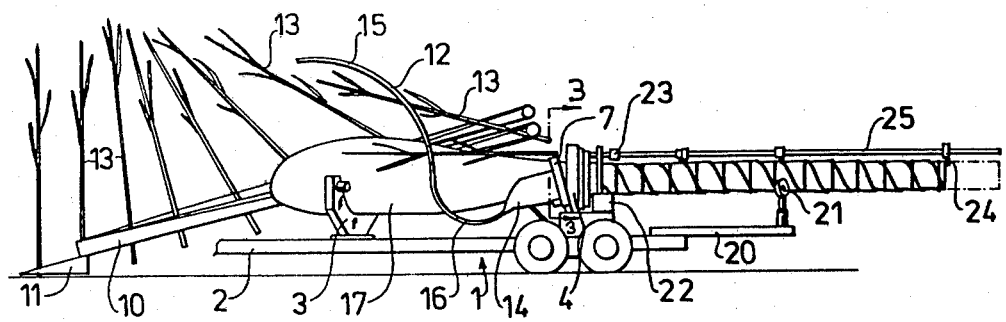
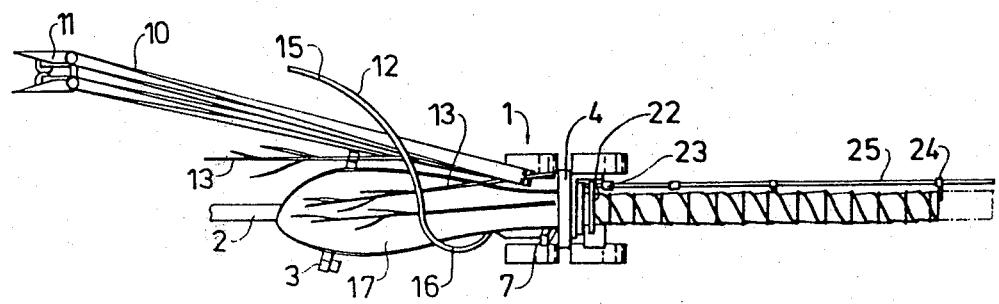

METHOD OF BUNDLING BRUSHWOOD

The present invention relates to a method of bundling brushwood, and to a machine for carrying out the method. By brushwood is meant here all manner of woody plants, including small trees, shrubs and other forms of undergrowth, grasses such as sugar cane, and the branches and tops of trees which have been felled. The term brushwood is also meant to include the trees of specially cultivated so-called energy forests, i.e forests which are planted for the sole purpose of providing material for energy production.

In present day harvesting techniques, the brushwood is reduced to chip form on the felling site. This work requires the use of relatively large energy-requiring machines, since a high input power is required to chip the brushwood. Moreover, when chips are formed from new wood, they are difficult to store by stacking, since the heat which is generated may result in self-combustion of the stack. Another disadvantage with known harvesting techniques is that special collecting bins or containers must be provided.

An object of the present invention is therefore to provide a method and a machine by which the brushwood can be collected in a form which greatly facilitates the handling and transportation of brushwood and which enables the brushwood to be stored with a reduced risk of self-combustion.

To this end there is provided in accordance with one aspect of the invention a method of bundling brushwood, which is mainly characterized by gathering the brushwood into a bunch having a length which exceeds the length of the longest item of brushwood present, orienting the various items of brushwood in a manner such that the thick ends of said items will be located generally on the outside of said bundle while the thinner ends of said items will extend generally inwardly of the bundle, and such that said thick ends of said items of brushwood are displaced relative to one another in the longitudinal direction of the bundle, so as to form a substantially cylindrical bundle of substantially uniform diameter, and by binding said bundle with straps or like holding elements.

The items of brushwood may be so oriented in the bundle that the thick ends of said items follow a substantially helical path around the outside of the substantially cylindrical bundle, or alternatively may lie in a plurality of respective substantially circular paths around the outside of the bundle, said circular paths being spaced along the length of the bundle. Irrespective of the mode applied, however, there will be obtained a compact, durable bundle which is resistant to bending and of uniform diameter or thickness.

The method is conveniently carried out continuously, whereat as the brushwood is bunched, lengths of desired size are continuously cut from the continuously ensuing bundle and loaded onto waiting transport, for conveyance to a consumer station, or simply stacked by the wayside, for collection. To ensure that each bundle length retains its compactness, the bundle is conveniently secured by means of wire, string, straps or like bonding elements, prior to being cut into said lengths.

According to another aspect, the invention also relates to a machine for carrying out the method. This machine is mainly characterized in that it comprises bundling means which includes a plurality of rotatable discs arranged in a circle about a central opening having a diameter which corresponds substantially to the desired diameter of the bundle, in that the axes of rotation of the discs extend somewhat obliquely relative to the generatrice of an imaginary cylinder which includes said circle, in that the discs are rotated in a common direction, so that an item of brushwood fed into said opening from one side is moved axially through the opening and simultaneously moved substantially around the centre axis of said opening, and in that arranged on the infeed side of bundling means are means for feeding items of brushwood into said opening with said thick ends leading. Because the axes of respective discs extend somewhat obliquely in the manner stated, the thick ends of respective items of brushwood will be located on the outside of the ensuing bundle, or stringer, with the thinner ends located inwardly of said bundle, thereby to form a compact, well-knitted bundle.

To facilitate the mutual orientation of the various items of brushwood in the bundle, the circular discs preferably partially overlap eachother.

As will be understood, some items of the brushwood being handled may have a considerable length and hence may cause some difficulty in feeding the thick ends of said items into the bundle former and in obtaining the desired pattern of orientation. To overcome this the machine is suitably provided on the infeed side of the former with a support means arranged to support the thin ends of said items of brushwood as the thick ends are fed into and through the former. In addition, the support means may be arranged to co-act with drive means for the purpose of assisting rotation of the brushwood around the centre axis of the opening, as the brushwood is fed into said opening.

So that the invention will be more readily understood and other features thereof made apparent, the invention will now be described with reference to the accompanying drawings, in which FIG. 1 illustrates schematically and in side view a machine according to the invention;

FIG. 2 is a top plan view of the machine illustrated in FIG. 1,

FIG. 3 is a sectional view taken on the line 3—3 of FIG. 1 and illustrates schematically the bundle-forming means of said apparatus; and FIG. 4 illustrates schematically a bundle of brushwood formed in accordance with the invention.

Referring now to FIGS. 1 and 2, there is shown generally at 1 a machine for forming bundles of brushwood in accordance with the invention. The machine comprises a wheeled platform 2 having mounted on one end thereof a rotary support device 3 which is operative in supporting the thin or top ends of items of brushwood fed to the machine and in causing said thin ends to move in a circular path during the inward feed of the brushwood, for a purpose hereinafter made apparent. The rotary support device supports the top ends of the items of brushwood being fed into the bundle former 4 and assists in rotating the not yet bundled bunch 17 of brushwood about its longitudinal axis. Such rotary support device 3 has a concave upper surface as shown and may contain upwardly facing rotary elements which contact and serve to rotate the surfaces of items of brushwood which come in contact therewith; such rotatable elements may be driven rollers or, preferably, an endless conveyor chain, similar to the conveyor chain provided in the infeed device 7, described below. Arranged on the platform 2, at some distance from the rotary support means 3, is a bundle former 4 comprising, as seen more clearly from FIG. 3, a plurality of circular plates or discs 6, and an infeeding device 7. The discs 6 are each mounted for rotation on a respective shaft 8, the speed of rotation being adjusted to the rate at which the brushwood is fed to the machine, so as to obtain a constant bundle diameter. As shown in FIG. 3, the end centres of respective shafts lie on a circle, such as to present an opening 9 of given diameter. Each of the discs is arranged to be driven, for example, by an hydraulic motor (not shown—it may be located on the opposite side of the disc 6 as viewed in FIG. 3) in a common direction of rotation, and the shafts of respective discs are inclined somewhat to the generatrice of an imaginary cylinder which includes the circle 9, thereby to ensure that the thick ends, or root ends, of the various items of brushwood will lie on the outside of said imaginary cylinder, while the thin ends of said items will be oriented towards the centre thereof. The manner in which an hydraulic motor rotates each disc is conventional, e.g. there may be a direct drive from the motor through its shaft to a disc, or intermediate means such as gear elements may be provided.

Co-operating with the rotary support means 3 is a belt conveyor 10 having arranged at one end thereof a felling device 11. As shown in FIG. 1, when small trees, e.g. trees 13, are felled by the device 11, they are drawn onto the conveyor 10 and carried thereon towards the bundle former 4, with the thick ends, or root ends, of the trees leading. It will be understood that brushwood which has already been uprooted, e.g. in a tree-felling operation, or which has the form of branches on tops previously severed from a tree, is fed to the conveyor manually, with the thick ends of the various items of brushwood leading. In order to ensure that the thin ends of said items are oriented in the manner desired during passage of the brushwood along the conveyor 10, there is provided a deflecting arm 12 which is mounted at one end thereof to a fixed mounting 14 on the platform.

As shown in FIG. 1, the deflecting arm 12 has two curved portions 15 and 16, the curve 16 being more pronounced than the curve 15. The curved portion 15 of the arm 14 is operative in deflecting the springy, bushy ends of the brushwood, referred to as the thin ends, downwardly into line with the thick ends of said brushwood. In this way there is formed a well-oriented bunch of brushwood, as shown at 17, which as it approaches the bundle former 4 is supported in the curved portion 16 of said arm, as illustrated in FIG. 2.

As brushwood moves continuously up the conveyor 10 and into the bundle former 4, the thick ends of the brushwood are moved by the infeed device 7 radially inwardly of the rotating discs 6, which draw the bundle through the opening while at the same time rotating said bundle. The infeed device 7 is inclined rearwardly from the discs 6 and has an elongate arm 19 on which dogging means 18 are arranged for movement, e.g. by means of an endless chain, around said arm in the longitudinal direction thereof, thereby to bring the thick ends of the brushwood into contact with the rotating discs 6.

Arranged behind the bundle former 4 is a bundle support means having the form of an elongate arm 20, which may be telescopic, and rollers 21.

As the bundle grows, it is necessary to bind the bundle in some suitable manner, so that it retains its compactness. To this end there is arranged behind the bundle former 4 a binding device 22 which is arranged to wrap a securing element, such as a metal strap for example, around the bundle at given moments of time. A wide variety of known binding devices can be used, possibly with minor, routine modifications, such as the various devices for wrapping binding straps around packages used in the packaging field; or devices such as that shown in the Beyette U.S. Pat. No. 2,856,845 or the Saxton U.S. Pat. No. 2,974,457.

For the purpose of cutting the bundle into lengths of desired size, e.g. six meters, there is arranged behind the bundle former 4 a cutting means 23, which is arranged to co-operate with a length sensing means 24 mounted on an arm 25 arranged to extend along the outside of the bundle. The cutting means 23 is arranged for movement along the arm 25 during a cutting operation at the same speed as the bundle grows, so as to render it unnecessary to stop the machine when cutting said bundle. When a length has been cut from the bundle, the cutting means is automatically returned to its starting position by means not shown. Such a cutting device may quite simply consist of a chain saw which is mounted on a carriage movable in the longitudinal direction of the bundle so that it can be moved at the same longitudinal velocity as the bundle during each cutting operation; such so called "flying" cutters are well known in the forest and sawmill industries.

One such severed bundle length is illustrated in FIG. 4. In this mode of bundling brushwood the thick ends, here referenced 26, follow a helical path around the bundle. The Figure also illustrates how the thick ends 26 lie on the outside of the bundle, with the thin ends of the brushwood extending inwardly thereof.

We claim:

1. A method of bundling items of brushwood, as small trees, shrubs and other forms of undergrowth, severed branches and tops of larger trees, and tall grasses such as sugar cane, comprising the steps of gathering said items of brushwood into a substantially cylindrical bundle of substantially uniform diameter and a length substantially exceeding the length of the longest item of brushwood present, the various items of brushwood being oriented with their thick ends located generally on the outside of said bundle and displaced relative to one another in the longitudinal direction of the bundle and with their thinner ends extending generally inwardly of the bundle, and binding said bundle with strap-like holding elements.

2. A method as claimed in claim 1, wherein said items of brushwood are positioned in said bundle with their thick ends located along a substantially helical path around the outside of said bundle.

3. A method as claimed in claim 1, wherein said items of brushwood are disposed in said bundle with their thick ends located along a plurality of respective circular paths around the outside of said bundle, said circular paths being mutually spaced in the axial direction of the bundle.

4. A method as claimed in claim 1, wherein said bundle is formed continuously in a single coherent, indefinite length and is cut into sections of a predetermined, uniform length.

* * * * *